C. C. ROCKWELL.
WIRELESS CHECK ROW ATTACHMENT FOR CORN PLANTERS.
APPLICATION FILED FEB. 16, 1909.
998,205.
Patented July 18, 1911.
2 SHEETS—SHEET 1.
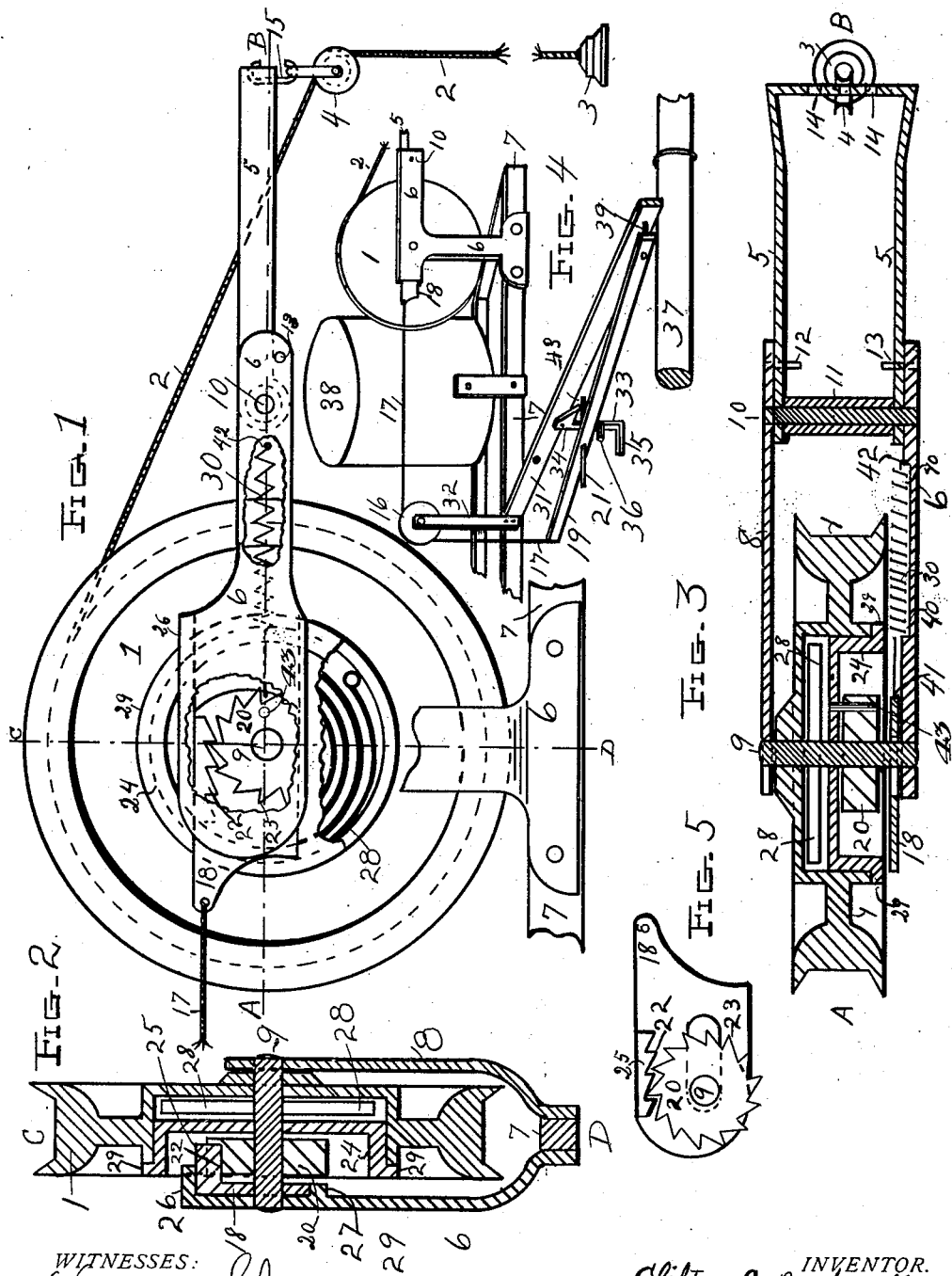
WITNESSES:
INVENTOR.
Clifton C. Rockwell
BY John F. Mullaney
ATTORNEY.

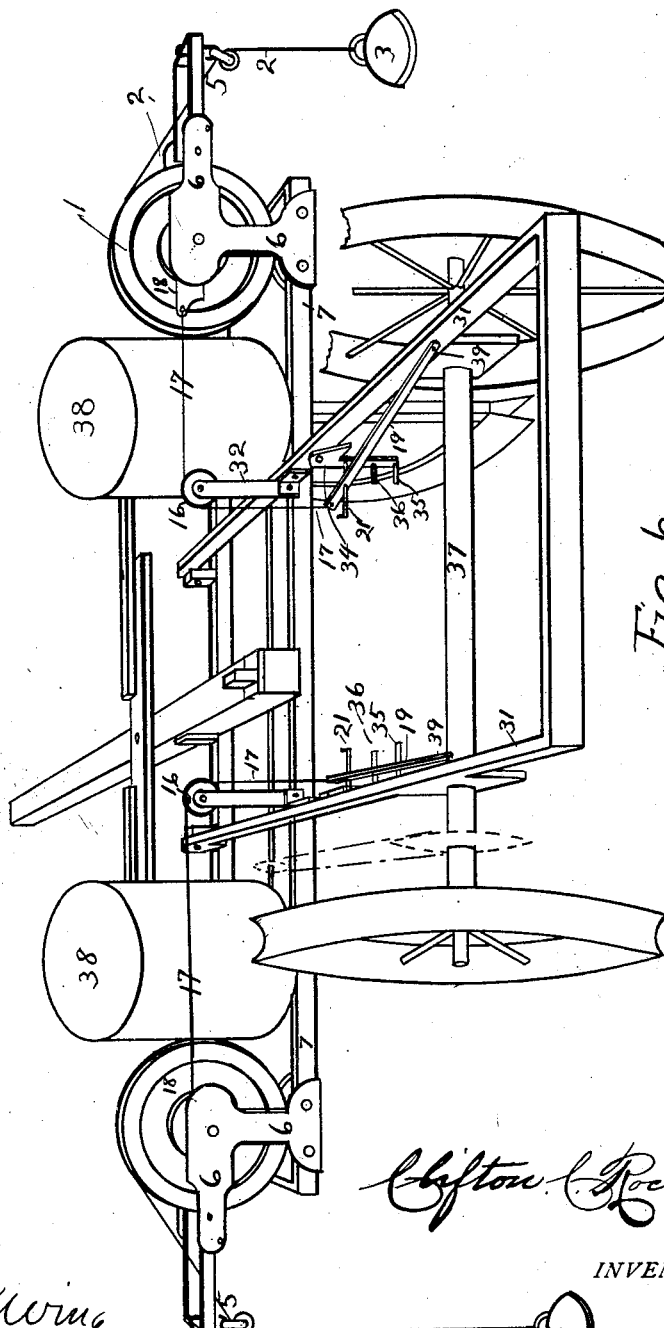

UNITED STATES PATENT OFFICE.

CLIFTON C. ROCKWELL, OF COLORADO SPRINGS, COLORADO.

WIRELESS CHECK-ROW ATTACHMENT FOR CORN-PLANTERS.

998,205. Specification of Letters Patent. Patented July 18, 1911.

Application filed February 16, 1909. Serial No. 478,302.

*To all whom it may concern:*

Be it known that I, CLIFTON C. ROCKWELL, a citizen of the United States, residing at Colorado Springs, county of El Paso, and State of Colorado, have invented a new and useful Wireless Check-Row Attachment for Corn-Planters and Similar Planting-Machines, of which the following is a specification.

My invention relates to improvements in checkrow attachments for corn planters in which a weight is used to be dropped upon the ground as a guide to the dropping of the first hill in the next row after turning the machine around preparatory to driving back across the field in the direction from which it had come, and having means for dropping said weight instantly after the dropping of the last hill. A cord or rope remains attached to the said weight while the machine is being turned around, and has means for lifting said weight from the ground after the machine has been turned around and holding it supported until the opposite side of the field is reached and until it is desired to again drop said weight upon the ground for marking the place of the line of the last hill and to be used as a guide for dropping the next hill after again turning. I attain these objects by the mechanism illustrated in the accompanying drawings in which—

Figure 1, is a side elevation of my attachment with some parts removed to show parts beyond. Fig. 2, is a sectional view of Fig. 1, on the line C, D. Fig. 3, is a horizontal section on the line A, B of Fig. 1. Fig. 4, is a perspective view, showing parts of the corn planter looking forward and downward to the right. Fig. 5 is a detailed view of the ratchet mechanism. Fig. 6 is a perspective view from the left hand rear of a corn planter containing the said, check row attachment complete with the weight on the left side down and the weight on the right side suspended.

Similar numerals refer to similar parts throughout the several views.

The cross bar 7, supporting the seed boxes 38, the longitudinal frame pieces 31, connecting the cross bar 7, with the axle 37, are the parts of the corn planter frame to which my improvements are attached and the winding drum 1, carrying the weight cord 2, with the supporting frame 6, and 8, composed of two side bars the outrig frame 5, the marking weight 3, the coil spring 28, and the ratchet wheel and rack in the hub of winding drum 1, together with the lifting lever 19, comprises the principal parts of my invention.

In the hub of grooved winding drum 1, is a spiral spring 28, attached at one end rigidly to the inside of the hub and at its other end attached rigidly to the journal 9, which journal 9, is attached at its ends in the rear supporting frame 6, and front supporting frame 8, comprising the said two side bars to revolve the drum at the right on top, as shown in Fig. 1, would open the spring as being drawn by the weight 3. This spring is supposed to be coiled upon itself closely while in a normal position unrestrained, so that it will be less liable to be filled with dirt, and the weight 3, when released has a tendency to uncoil the spring 28, from its normal coiled position. This spring is normally under sufficient tension to enable it to take up the slack in the weight cord 2, but not stiff enough to lift weight 3, from the ground, so that when the weight is once dropped to the ground the machine can move away from it some twenty (20) feet or more without pulling the weight from its resting place on the ground, by reason of the drum 1, turning on journal 9, and paying out the weight cord 2, and when the machine is moved back to its former position the slack in weight cord 2, will be taken up by the recoil of the coil spring 28, rotating the drum 1, top to the left, in Fig. 1 thus winding up the weight cord 2, but not with sufficient force to lift the marking weight 3, from the ground where it remains to indicate the place for the line for dropping of the first hill on the new row across the field.

The mechanism shown in these drawings is for the right hand side of the planter described herein. The drawings pertain to the right hand side of a corn planter and the mechanism here described is such as would be used on the side of the planter toward that part of the field which has been planted. There are, however, two sets like the one described, one for the left hand side of the planter, and one for the right hand side, the one described being for the right hand side only. The one for the left hand side being exactly like this one excepting that it is made in a reverse order, and it is intended to have both a right side attachment and left side attachment on the same planter. After the driver has turned his machine to the right and reversed it, with a view of proceeding back across the field, he locates the line for the first hill on the next row by means of marking weight 3. He then raises marking weight 3, from the ground by means of mechanism shown in the drawings, as follows:—By pressing his foot on treadle 21, and forcing down lifting lever 19, he pulls the wire cord 17, to the left which pulls ratchet rack 18, to the left, which ratchet rack 18, has rack teeth 22, which engage ratchet teeth 23, on the periphery of ratchet wheel 20, which ratchet wheel 20, is rigidly attached by means of the pin 42, and the journal 9 to hub cup 24, which is rigidly attached at its rim flange 29, to winding drum 1; and thus turning ratchet wheel 20, to the left on top, the top of drum 2, which is turned to the left on top, draws wire cord 2, to the left, forcibly, until the marking weight 3, is lifted to the desired height and the lifting lever 19, after being pressed down to the desired distance is engaged by release ratchet 33, engaging hold pin 43, in lifting lever 19, thus holding lifting lever 19, down and thus holding marking weight 3, suspended clear of the ground.

When it is desired to drop marking weight 3, the operator presses his foot on the treadle 35, of release latch 33, and presses it forward till it slides off of hold pin 43, when it is released from hold pin 43, it releases the tension on wire cord 17, which allows marking weight 3, to drop at once to the ground expanding spring 28 and rotating the drum top to the right in Fig. 1. There is a check pin 36, on the left side of the release latch 33, the purpose of which is to prevent lifting lever 19, from being forced too far down by the foot of the operator. When the ratchet rack 18, is released from tension on wire cord 17, it is drawn backward to the right, by means of spiral spring 30, shown in Fig. 1, and Fig. 3, to a position where it may be ready to again engage ratchet teeth 23, by means of the rack teeth 22, on the under side of flange 25, of the ratchet rack.

To make the machine more compact for the purpose of passing through narrow gates or freeing obstructions to the side of the planter, I have provided the outrig frame 5, 5, which is pivoted on the bolt 10, so that it may fold up and back on the supporting frame 6, and 8.

At the outer end of rear supporting frame 6, and front supporting frame 8, are located two lug pins 13, and 12, respectively, so arranged that when the outrig frame 5, 5, is extended, the under part of the frame rests down upon the said lug pins 13, and 12, and is supported by them as shown in Fig. 1, and Fig. 3.

In the cross bar at the outer end of outrig frame 5, 5, are adjusting notches 14, 14, for the purpose of receiving the upper end of double hook 15, for the purpose of adjusting the marking weight 3, laterally on the corn planter frame to suit the marking of the last hill to the peculiar conditions of the different makes of planters.

To facilitate the free motion of the weight cord 2, I have provided the outrig swivel pulley 4, to reduce friction on the weight cord 2, and the swivel in the frame of outrig swivel pulley 4, is provided to compensate by permitting the pulley wheel to present its grooved edge in the direction of the weight. The swivel for the said outrig swivel pulley 4, is connected to the lower hook of the double hook 15, so that it may easily swing forward or backward or in and out to accommodate the line of draft of said weight cord 2.

Supporting pulley 16, is provided to keep the horizontal part of wire cord 17, at such a position as to draw ratchet rack 18, directly back to the left so as not to cramp it in the guides provided by projecting angle flange 26, and supporting angle flange 27, which are provided for the purpose of conforming said ratchet rack 18, to a direct line of motion.

In the rear supporting frame 6, is a recess 40, to provide room for the spiral spring 30, which is attached at its left end 41, to one end of ratchet rack 18, and attached at its right end 42, rigidly to rear supporting frame 6, and has a tendency to draw ratchet rack 18, to the right.

It is to be understood that this chainless checkrow is appropriate for not only planting corn, but for any seeds or plants where it is required to have the hills rowed two ways at right angles to each other.

It is to be further understood that the dropping mechanism for the planter is to be operated by means of a corn planter wheel or some other gearing connected with the ground and that this invention is simply an attachment for a corn planter or other planter, otherwise in itself not complete for checkrowing purposes.

I am aware that prior to my invention attachments have been invented and used to obviate the necessity of a rope, chain, or wire being stretched across the field to operate the dropping mechanism of a planter. I, therefore, do not claim broadly such an attachment; but

I claim:

1. An attachment for planters, comprising a suitable frame, a winding drum, a journal therefor, a coil spring located within the drum and having its ends secured to the drum and journal respectively, a cord secured at one end to the said drum and a marking weight attached to the other end of the cord, substantially as set forth.

2. An attachment for planters, comprising a suitable frame, a winding drum, a journal therefor, a coil spring located within the drum and having its ends secured to the drum and journal respectively, a cord secured at one end to the drum and a marking weight attached to the other end of the cord, a toothed wheel attached to the side of the drum turning concentric therewith on the same journal, a treadle, and a cord connecting said treadle and a rack engaging said toothed wheel, all substantially as set forth.

3. An attachment for planters, comprising a suitable frame, a winding drum, a journal therefor, a coil spring located within the drum and having its ends secured to the drum and journal respectively, a cord secured at one end to the drum and a marking weight attached to the other end of the cord, a toothed wheel attached to the side of the drum turning concentric therewith on the same journal and a ratchet rack provided to engage the teeth in the toothed wheel, all substantially as set forth.

4. An attachment for planters, comprising a suitable frame, a winding drum, a journal therefor, a coil spring located within the drum and having its ends secured to the drum and journal respectively, a cord secured at one end to the drum and a marking weight attached to the other end of the cord, a toothed wheel attached to the side of the drum turning concentric therewith on the same journal a ratchet rack provided to engage the teeth in the toothed wheel, and a coil spring attached to one end of the rack adapted to disengage it from said toothed wheel, all substantially as set forth.

5. An attachment for planters, comprising a suitable frame, a winding drum, a journal therefor, a coil spring located within the drum and having its ends secured to the drum and journal respectively, a cord secured at one end to the drum and a marking weight attached to the other end of the cord, a toothed wheel attached to the side of the drum turning concentric therewith on the same journal, a ratchet rack provided to engage the teeth in the toothed wheel, a coil spring attached to one end of the rack adapted to disengage it from said toothed wheel, a treadle bar and a cord attached to the opposite end of the rack and the other end of the cord being attached to said treadle bar near its center, all substantially as set forth.

6. An attachment for planters, comprising a suitable frame, a winding drum, a journal therefor, a coil spring located within the drum and having its ends secured to the drum and journal respectively, a cord secured at one end to the drum and a marking weight attached to the other end of the cord, a toothed wheel attached to the side of the drum and turning concentric therewith on the same journal, a ratchet rack provided to engage the teeth in the toothed wheel, a coil spring attached to one end of the rack and adapted to disengage it from said toothed wheel, a cord attached to the opposite end of the rack and the other end of the cord being attached to a treadle bar near its center, and a guide pulley provided to support the cord between the treadle bar and the rack, all substantially as set forth.

7. An attachment for planters, comprising a suitable frame, a winding drum, a journal therefor, a coil spring located within the drum and having its ends secured to the drum and journal respectively, a cord secured at one end to the drum and a marking weight attached to the other end of the cord, a toothed wheel attached to the side of the drum and turning concentric therewith on the same journal, a ratchet rack provided to engage the teeth in the toothed wheel, a coil spring attached to one end of the rack adapted to disengage it from said toothed wheel, a treadle bar, a cord attached to the opposite end of the rack and the other end of the cord being attached to a treadle bar near its center, a guide pulley provided to support the cord between the treadle bar and the rack, and a locking device to retain said treadle bar down and hold said marking weight suspended, all substantially as set forth.

8. An attachment for planters, comprising a suitable frame, a winding drum, a journal therefor, a coil spring located within the drum and having its ends secured to the drum and journal respectively, a cord secured at one end to the drum and a marking weight attached to the other end of the cord, a toothed wheel attached rigidly to the side of the drum turning concentric therewith on the same journal, a ratchet rack provided to engage the teeth in the toothed wheel, a treadle bar, a coil spring attached to one end of the rack and provided to disengage it from said toothed wheel, a cord attached to the opposite end of the rack and the other end of the cord being attached to a treadle bar near its center, a guide pulley provided to support the cord between the treadle bar and the rack, a locking device to retain said treadle bar down and hold said marking weight suspended, and a folding outrig frame supporting said marking weight, all substantially as set forth.

9. In an attachment for corn planters, the combination of a winding drum 1, a spring 28, adapted to actuate said drum, a ratchet wheel attached to said drum and turning concentric therewith, ratchet teeth 23, the rack teeth 22, on ratchet rack 18, the ratchet rack 18, the cord 17, adapted to actuate said ratchet 18, the lifting lever 19, and the treadle 21, all substantially as set forth and for the purposes specified.

10. The combination in an attachment for corn planters, of the horizontal frames 6 and 8, the shaft 9, the winding drum 1, the coil spring 28, and the weight cord 2, with a two row corn planter, all substantially as set forth and for the purposes specified.

11. In a wireless or chainless checkrow attachment for corn planters, a marking weight on a weight cord, a winding drum, around which said weight cord is wound as on a spool, a coil spring adapted to take up slack in said weight cord, all for the purposes as specified.

12. In a chainless checkrow attachment for corn planters, a marking weight, a winding drum 1, around which is an annular groove carrying a weight cord attached to said marking weight, a shaft through said drum, a coil spring adapted to actuate said winding drum in winding up said weight cord, a suitable frame supporting same on a corn planter, all substantially as set forth and for the purposes specified.

13. In an attachment for corn planters, the combination of a winding drum carrying a weight cord in a suitable annular groove and turning upon a horizontal shaft in its center, a coil spring around its hub, said coil spring being inclosed within the body of said winding drum, the inner end of said coil spring being attached to the shaft upon which said winding drum turns and the outer end of said coil spring being rigidly attached to the body of said winding drum, with a pedal lever connected by a cord, all substantially as set forth, and for the purposes specified.

14. In a check row attachment for corn planters, a winding drum around which is wound a weight cord, and attached to a marking weight at its free end, a ratchet wheel attached to the side of said winding drum and on the same shaft on said ratchet wheel, adapted to engage the teeth of a ratchet rack, a ratchet rack actuated by means of a treadle and cord, all substantially as set forth and for the purposes specified.

15. An attachment for planters, comprising in combination the supporting frames 6, and 8, the horizontal frames 7, attached upon the planter, the outrig frame 5, pivoted suitably to fold back upon the frames 6 and 8, at the pivot bolt 10, the lug pins 12, in supporting frame 8, and the lug pins 13, in supporting frame 6, a horizontal lateral bar at the outer end of the supporting frame 6, notches 14, in said lateral bar, the double hook 15 pendant from said lateral bar, the outrig swiveled pulley 4, pendant from said double hook and carrying the weight cord 2, having attached to its free end marking weight 3, the winding drum 1, the coil spring 28, the ratchet rack 18, and a pedal lever connected by a cord to said ratchet rack 18, substantially as set forth and for the purposes specified.

CLIFTON C. ROCKWELL.

Witnesses:
KATHERINE SHEERAN,
H. K. WING.

---

Copies of this patent may be obtained for five cents each, by addressing the "Commissioner of Patents, Washington, D. C."